Patented Feb. 7, 1928.

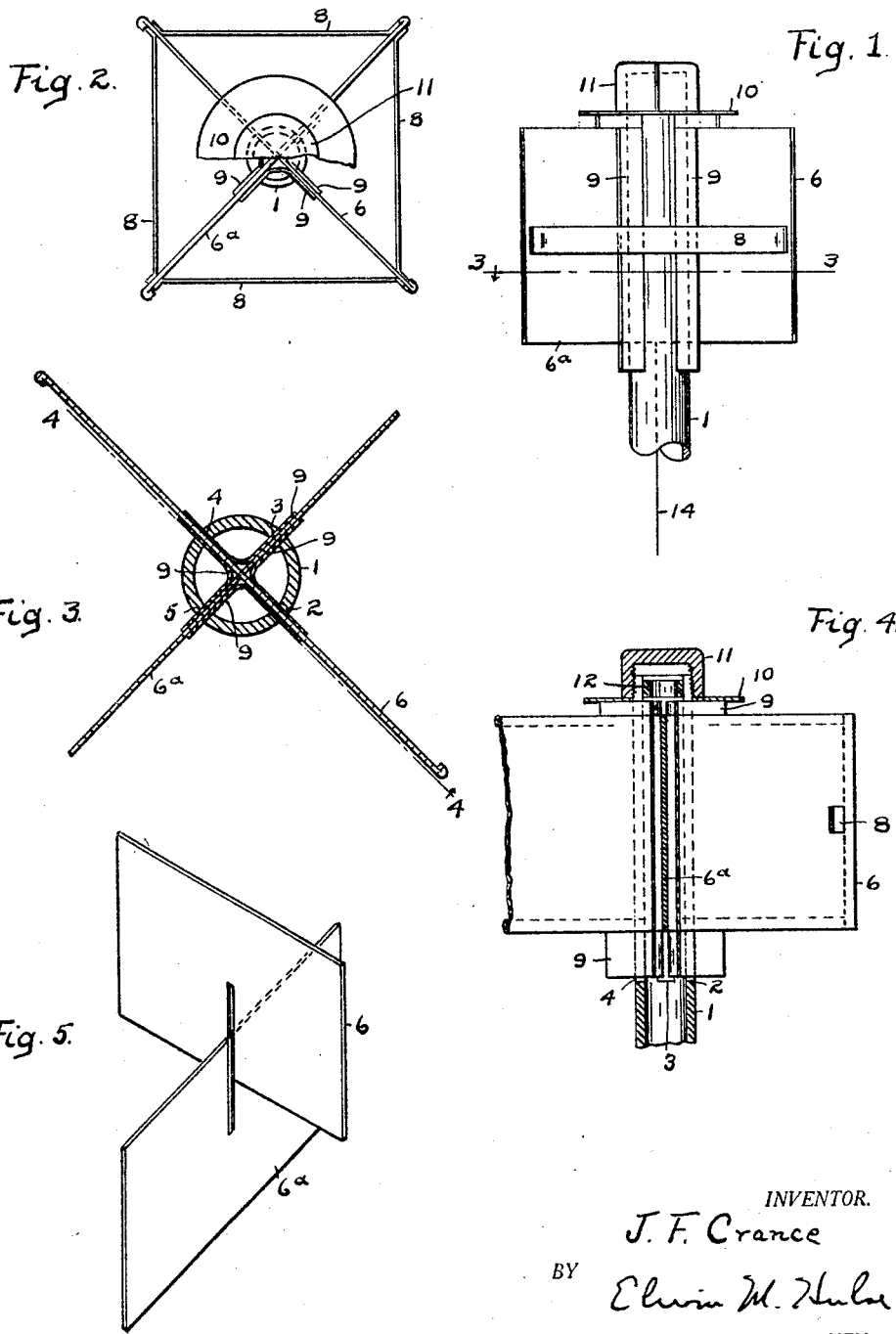

1,658,761

UNITED STATES PATENT OFFICE.

JOSEPH F. CRANCE, OF FORT WAYNE, INDIANA.

RADIOANTENNA.

Application filed June 7, 1926. Serial No. 114,082.

The invention relates to aerials for radio receiving sets. Its object is to provide a simple and efficient device that may be installed at small cost and occupy a minimum of space.

The invention consists of a spider or a series of radially disposed conductor plates and a circuit wire connected to the plates and extended for attachment to the receiving set.

The invention is illustrated in the accompanying drawings, in which

Figure 1 is an elevational view of the device; Fig. 2 a plan view of the same; Fig. 3 a cross-sectional view on line 3—3 of Fig. 1; Fig. 4 a cross-sectional view on line 4—4 of Fig. 3, and Fig. 5 a perspective view of the separated conductor plates.

In the illustrative embodiment of the invention the conduit 1, preferably a pipe, may be secured to a building or other object. The conduit may be of any desired length, whether the device is installed as an outside or an inside aerial. The upper end of the conduit is vertically slotted as shown at 2, 3, 4 and 5, the number of slots depending upon the number of radial wings to be used. I have found that four wings operate very satisfactorily. In order to cheapen the cost of the manufacture, I use two plates 6, 6ª, and form a slot in each extending approximately one-half the height of the plate. One of the plates is inverted and the two plates are then disposed upon each other with the unslotted portion of each plate at the end of its slot engaged in the slot of the other plate. The plates thus assembled may be soldered or otherwise secured together so as to insure an electrical connection between them and form a spider. Braces 8 are secured to adjacent wings of the spider and not only reinforce them but also electrically connect them, the wings and the braces being formed of suitable metal, preferably copper. The spider thus formed is installed in the slots 2, 3, 4 and 5 in the conduit. Strips of fibre or other insulation 9 are also inserted in the slots on opposite sides of each wing of the spider to fully insulate the spider from the conduit and lock it thereto.

The upper edges of the strips 9 engage the lower side of a washer 10 of suitable material, such as fibre, that is disposed on the conduit. A cap 11 is threaded on the conduit and bears on the washer to tie the parts together. The washer 10 functions as a guard to shed rain and snow and prevent the same from entering the conduit.

To prevent the collapse of the slotted upper end of the conduit when the cap 11 is installed, I insert therein a short sleeve 12 which engages the inner face of the conduit and supports it.

A conductor 14 is secured to the spider in suitable manner and it is led through the conduit to the desired point.

What I claim is:

1. A radio antenna consisting of a conduit having a plurality of vertical slots in its upper end, a conductor plate in each slot and radiating from the conduit, the inner ends of the plates being electrically secured together within the conduit, insulating members in each slot and upon opposite sides of the plate, a guard on the conduit above the plates, a cap on the conduit adapted to clamp the guard on the insulating members and an electrical conductor connected to the plates and extending through the conduit.

2. A radio antenna consisting of a conduit having a plurality of slots in its upper end, conductor members in the slots respectively and radiating from the conduit and connected together within the conduit, insulating members in each slot to insulate the member from the conduit, a guard on the conduit above the conductor members and means to cause the guard to rigidly hold the members in the slots.

In witness whereof I have hereunto signed my name this 3rd day of June, 1926.

JOSEPH F. CRANCE.